US012147322B1

(12) United States Patent
Gilboa et al.

(10) Patent No.: US 12,147,322 B1
(45) Date of Patent: Nov. 19, 2024

(54) DYNAMIC MULTI CLOUD CONTROL

(71) Applicant: Finout Ltd, Tel Aviv (IL)

(72) Inventors: Zohar Yizhar Gilboa, Rehovot (IL); Nir Winkler, Even Yehuda (IL); Guy Meler, Tel Aviv (IL)

(73) Assignee: Finout Ltd, Tel Aviv (IL)

( * ) Notice: Subject to any disclaimer, the term of this patent is extended or adjusted under 35 U.S.C. 154(b) by 0 days.

(21) Appl. No.: 18/513,712

(22) Filed: Nov. 20, 2023

(51) Int. Cl.
*G06F 11/34* (2006.01)
*G06F 9/455* (2018.01)

(52) U.S. Cl.
CPC .......... *G06F 11/34* (2013.01); *G06F 9/45558* (2013.01); *G06F 2009/45595* (2013.01)

(58) Field of Classification Search
CPC ....... G06F 9/45558; G06F 2009/45595; G06F 11/3409; G06F 11/3006; G06F 11/3466
See application file for complete search history.

(56) References Cited

U.S. PATENT DOCUMENTS

| | | | |
|---|---|---|---|
| 9,678,850 B1* | 6/2017 | Rickard | G06F 11/3409 |
| 10,346,054 B1* | 7/2019 | Gudipati | G06F 3/0683 |
| 10,536,277 B1* | 1/2020 | Kruse | G06F 12/1408 |
| 2012/0311153 A1* | 12/2012 | Morgan | H04L 12/00 709/226 |
| 2020/0349173 A1* | 11/2020 | Chawla | G06F 16/283 |
| 2022/0239681 A1* | 7/2022 | Newman | G06F 11/3006 |

* cited by examiner

*Primary Examiner* — Jacob D Dascomb

(57) ABSTRACT

A system for monitoring usage of cloud resources across multiple cloud services, comprising a unified data engine and a virtual tag engine. The unified data engine is adapted to collect cloud resources usage data relating to a plurality of cloud resources of a plurality of cloud services used by a plurality of clients, and update, based on the cloud resources usage data, a unified data structure mapping usage of the plurality of cloud resources by the plurality of clients. The virtual tag engine is adapted to generate one or more virtual tags based on one or more tag rules for monitoring usage of one or more cloud resources of multiple cloud services by one or more of the plurality of clients, apply the virtual tag(s) to the unified data structure, and execute one or more multi-cloud operations over the multiple cloud services using the virtual tag(s).

19 Claims, 4 Drawing Sheets

DYNAMIC MULTI CLOUD CONTROL

BACKGROUND

The present invention, in some embodiments thereof, relates to monitoring usage of cloud resources, and, more specifically, but not exclusively, to monitoring usage of cloud resources across multiple cloud services and taking one or more actions accordingly.

Cloud computing has become an integral part of IT infrastructure, enabling businesses to scale, innovate, and operate more efficiently. It has revolutionized the way applications are developed, deployed, and managed, empowering organizations of all sizes to leverage powerful computing resources with minimal upfront investment.

Cloud computing provides network and internet based access to shared computing resources and services, such as, for example, Infrastructure as a Service (IaaS), Platform as a Service (PaaS), Software as a Service (SaaS), and/or the like facilitated through virtualization technologies.

Cloud services have therefore come to replace or at least significantly reduce the need for on-site physical hardware as well as on-site deployment of infrastructure, software, and/or other services thus offering on-demand services, scalability, and efficient resource allocation to significantly reduce costs, maintenance, support, and complexity while increasing accessibility to the cloud resources from practically any place, at any time, using any client device.

SUMMARY

According to a first aspect of the present invention there is provided a system for monitoring usage of cloud resources across multiple cloud services, comprising a unified data engine and a virtual tag engine. The unified data engine is adapted to collect cloud resources usage data relating to a plurality of cloud resources of a plurality of cloud services used by a plurality of clients, and update, based on the cloud resources usage data, a unified data structure mapping usage of the plurality of cloud resources by the plurality of clients. The virtual tag engine adapted to generate one or more virtual tags based on one or more tag rules for monitoring usage of one or more cloud resources of multiple cloud services by one or more of the plurality of clients, apply the one or more virtual tags to the unified data structure, and execute one or more multi-cloud operations over the multiple cloud services using the one or more virtual tags.

According to a second aspect of the present invention there is provided a method of monitoring usage of cloud resources across multiple cloud services, comprising using a unified data engine and a virtual tag engine. The unified data engine is adapted for collecting cloud resources usage data relating to a plurality of cloud resources of a plurality of cloud services used by a plurality of clients, and updating, based on the cloud resources usage data, a unified data structure mapping usage of the plurality of cloud resources by the plurality of clients. The virtual tag engine is adapted for generating one or more virtual tags based on one or more tag rules for monitoring usage of one or more cloud resources of multiple cloud services by one or more of the plurality of clients, applying the one or more virtual tags to the unified data structure, and executing one or more multi-cloud operations over the multiple cloud services using the one or more virtual tags.

According to a third aspect of the present invention there is provided a computer program product of monitoring usage of cloud resources across multiple cloud services, comprising a non-transitory medium storing thereon computer program instructions which, when executed by one or more hardware processors, cause the one or more hardware processors to: execute a unified data engine and a virtual tag engine. The unified data engine is executed for collecting cloud resources usage data relating to a plurality of cloud resources of a plurality of cloud services used by a plurality of clients, and updating, based on the cloud resources usage data, a unified data structure mapping usage of the plurality of cloud resources by the plurality of clients, The virtual tag engine is executed for generating one or more virtual tags based on one or more tag rules for monitoring usage of one or more cloud resources of multiple cloud services by one or more of the plurality of clients, applying the one or more virtual tags to the unified data structure, and executing one or more multi-cloud operations over the multiple cloud services using the one or more virtual tags.

In a further implementation form of the first, second and/or third aspects, the one or more multi-cloud operations comprise detecting one or more anomalous usages of the one or more cloud resources of the multiple cloud services by the one or more clients according to one or more anomaly rules applied to the one or more virtual tags.

In a further implementation form of the first, second and/or third aspects, the one or more multi-cloud operations comprise communicating automatically with one or more of the cloud services to request adjustment of allocation of one or more of its cloud resources according to the one or more virtual tags.

In a further implementation form of the first, second and/or third aspects, the one or more multi-cloud operations comprise generating one or more unified usage reports according to the one or more virtual tags. The one or more unified usage reports reflect usage of the one or more cloud resources of the multiple cloud services by the one or more clients.

In a further implementation form of the first, second and/or third aspects, the one or more multi-cloud operation comprise exporting at least part of the cloud resources usage data relating to one or more clients associated with one or more users to one or more storage resources of the one or more users.

In a further implementation form of the first, second and/or third aspects, the unified data structure is continuously updated based on updated cloud resources usage data collected in real-time.

In a further implementation form of the first, second and/or third aspects, the unified data engine constructs the unified data structure to expose all features of each of the plurality of cloud services to enable defining the one or more tag rules with respect to each of one or more of a plurality of features of each of one or more of the plurality of cloud services.

In a further implementation form of the first, second and/or third aspects, the unified data engine collects the usage data relating to the plurality of cloud services by communicating with each of the plurality of cloud services using its respective Application Programming Interface (API).

In an optional implementation form of the first, second and/or third aspects, the one or more virtual tags are applied to reflect historic cloud resources usage data recorded in the unified data structure prior to the applying of the one or more virtual tags.

In an optional implementation form of the first, second and/or third aspects, one or more recursive virtual tags are generated based on one or more another virtual tags.

In an optional implementation form of the first, second and/or third aspects, one or more of the virtual tags are generated based on a plurality of interdepending tag rules having dependency relation with each other.

In an optional implementation form of the first, second and/or third aspects, the dependency between the plurality of interdepending tag rules is detected automatically.

In a further implementation form of the first, second and/or third aspects, the one or more tag rules are user defined.

In a further implementation form of the first, second and/or third aspects, the virtual tag engine is further adapted to adjust one or more web based Graphical User Interfaces (GUI) for interacting with one or more users to support the one or more users in conducting at least of: generating tag rules, and/or accessing report data generated by the virtual tag engine.

In a further implementation form of the first, second and/or third aspects, the virtual tag engine is further adapted to expose an application programming interface for interacting with one or more applications to enable the at least one application to conduct at least of: generate tag rules, and/or access report data generated by the virtual tag engine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
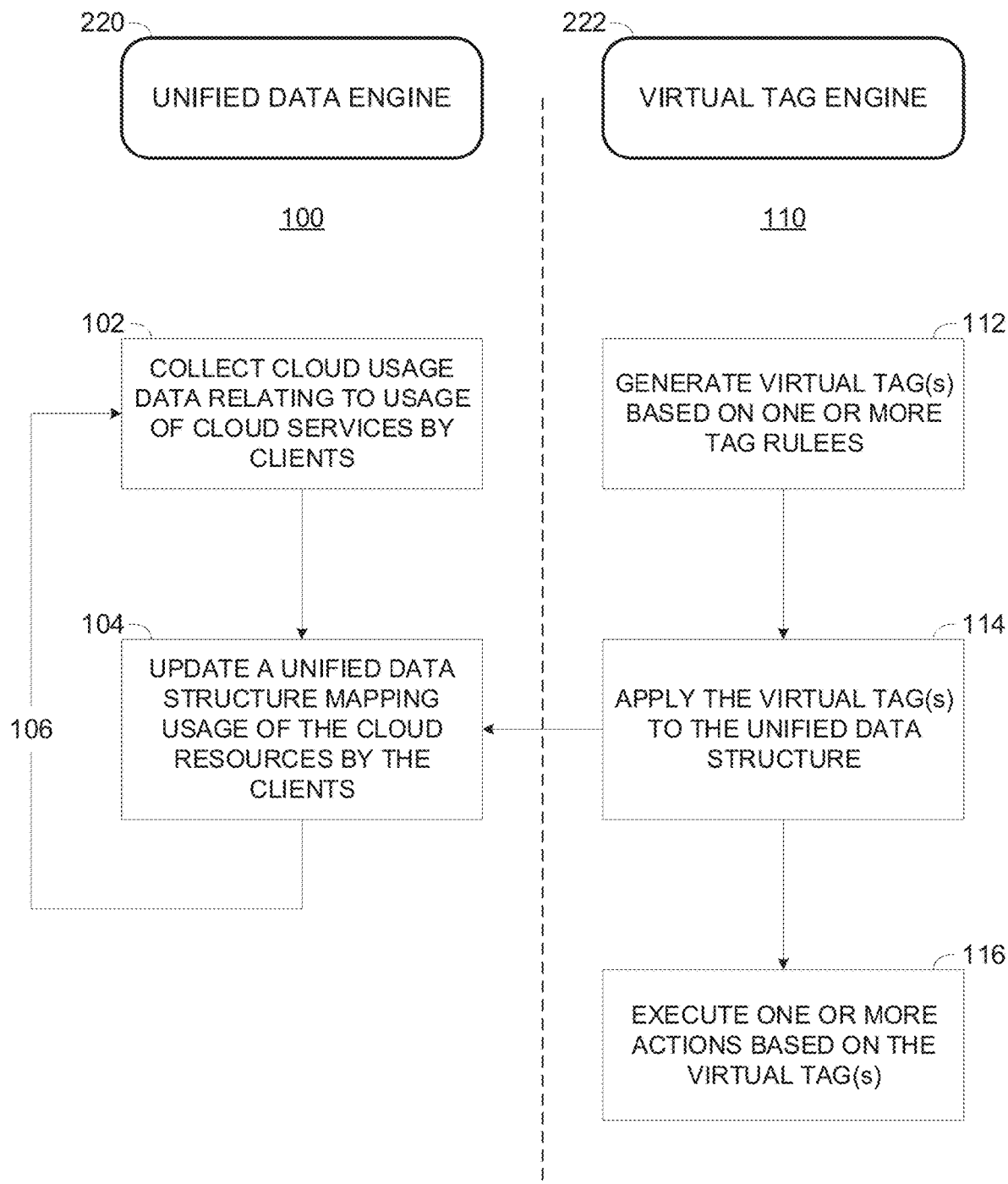
FIG. 1 is a flowchart of an exemplary processes of monitoring usage of cloud resources across multiple cloud services, according to some embodiments of the present invention.

The present invention, in some embodiments thereof, relates to monitoring usage of cloud resources, and, more specifically, but not exclusively, to monitoring usage of cloud resources across multiple cloud services and taking one or more actions accordingly.

Usage of centralized virtualized cloud computing resources and services available through one or more virtualization platforms, systems, and/or technologies, for example, SaaS, Pass, IaaS, and/or the like, shows in exponential growth in recent years and is expanding every day.

As more and more entities, for example, organization, companies, institutions, agencies, and/or the like make use of cloud computing resources, monitoring this use has become a major concern and highly important for a plurality of goals and applications, for example, efficient resource utilization and organization, scalability, cost management, and/or the like.

Cloud computing resource tagging has become one of the most efficient practices for monitoring and tracking use of cloud resources and services by such entities, either global usage of computing, storage, and/or networking resources as well as by clients, for example, users, developers, suppliers, customers, and/or the like using their client devices to access the cloud resources.

Tagging has proved highly efficient for entities comprising multiple groups, divisions, branches, projects, tasks, and/or the like, collectively designated units, which may be associated with many clients but are significantly independent from each other in terms of cost and/or profit, data resources and/or time sharing, and/or the like since, using tags, usage of the cloud resources may be monitored and tracked per any single unit and/or a combination thereof.

Cloud resource tagging refers, as known in the art, to the practice of attaching metadata, labels, or identifiers to various resources within a cloud environment, for example, services, computing resources (e.g., virtual machines, etc.), storage resources (e.g., storage objects, databases, etc.), network resources (networking components), frameworks, infrastructures, and/or the like.

The tag metadata associated with a cloud resource may indicate, reflect, and/or describe one or more attributes of usage of the respective cloud resource by clients. The tags may typically be in the form of key-value pairs, where the key is a label and the value provides specific information about the resource.

Many entities may typically use cloud resources, for example, provided by a plurality of vendors, for example, Amazon Web Service (AWS) and Elastic Compute Cloud (EC2), Google Cloud Platform (GCP), Microsoft Azure, Oracle, Alibaba, DataDog, Kubernetes, Prometheus, Logz.io, CronJob, and/or the like.

However, such tags may be each limited to a single cloud service (platform) since the different cloud services (platforms) are independent of each other and typically provided, and/or operated by different vendors thus preventing cross cloud tagging.

According to some embodiments of the present invention, there are provided methods, systems, devices and computer software programs for monitoring usage of cloud resources by clients across multiple cloud services using virtual tags aggregating usage data from the plurality of cloud services.

Usage data relating to usage of cloud resources of the plurality of cloud services may be collected and updated in a centralized unified data structure, for example, a record, a file, a database, a table, a list, and/or the like such that cloud resources usage data descriptive of use of the cloud resources by clients across multiple cloud services may be stored and mapped in the unified data structure. The unified data structure may be updated in real-time, continuously and/or periodically such that the cloud resources usage data may be up to date at any given time.

Since the cloud services may employ and/or utilize a plurality of different APIs, access protocols, communication interfaces and/or the like for communicating, accessing, and exchanging data with the cloud services. Therefore, a respective API, access protocol, and/or communication interface may be used for collecting the cloud resource usage data from each of the cloud services.

Moreover, different cloud services may expose and/or support different functionality, settings, controls, options, and/or the like even for similar cloud resources. The unified data structure may be therefore adapted, structured, arranged, and/or updated to reflect all of the functionality, settings, controls, and/or options of each of the cloud services.

A virtual tag engine may create one or more virtual tags for monitoring usage of one or more cloud resources by one or more clients (client devices) across a plurality of cloud services rather than resources of a single cloud resource as may be done by legacy tags. The tag rules may be created based on tag rules defined manually and/or automatically.

The virtual tag engine may then apply the virtual tags to the unified data structure mapping usage data of the cloud resources across the plurality of cloud services. As such, the virtual tags may reflect aggregated and/or cumulative cloud resources usage data relating to usage of cloud resources across the plurality of cloud services.

Moreover, since the unified data structure may store cloud resources usage data mapping past (historic) usage of cloud resources across the plurality of cloud services, one or more virtual tags may be applied to retroactively reflect backwards historic usage data.

Furthermore, one or more virtual tags may be created recursively based on one or more other virtual tags. For example, multiple tag rules based on which the virtual tags are created and defined may be interdependent on each other.

For example, assuming a first virtual tag is created based on one or more first tag rules and a second virtual tag is created based on one or more second tag rules which are dependent on the first tag rule(s). In such case, the second virtual tag may be created and/or defined recursively with respect to the first virtual tag.

In addition, the recursive virtual tag generation may facilitate the ability to create and use hierarchical virtual tags having one or more levels which may be dynamically adjusted in real-time according to new and/or adjusted tag rules.

Based on the virtual tags, the virtual tag engine may execute one or more operations, specifically multi-cloud operations, for example, detect anomalies in usage of resources across multiple cloud services, generate usage reports (e.g., cost, utilization, etc.) aggregating information from multiple cloud services, up-scale and/or down-scale cloud resources across multiple cloud services, exporting usage data and/or virtual tag information to client's storage resources (e.g., bucket, container, etc.), and/or the like.

Applying virtual tags for monitoring usage of cloud resources across multiple cloud services may present major benefits and advantages compared to currently existing cloud tagging methods and systems.

First, using existing cloud resource tagging, entities (users) using cloud resources across multiple cloud services may need to interact and communicate with each of the cloud services individually using multiple different APIs, access protocols, and/or communication interfaces specific to each cloud service. In contrast, using virtual tagging, such users (entities) utilizing cloud resources across multiple cloud services may need to interact with only a single agent, namely the virtual tag engine, to define virtual tags across the multitude of cloud service. This single point of interaction may significantly increase performance of the cloud resources tagging at the user's end, for example, reduced latency, reduced access time, increased accessibility (to cloud services) and/or responsiveness, and/or the like since the users interact only with the single and centralized virtual tag engine.

The single point interaction with the virtual tag engine may also significantly reduce complexity, redundancy, and/or the like of the user's cloud resources tagging and monitoring means since he no longer needs to interact individually with each cloud service which may significantly reduce development, deployment, and/or maintenance computing resources (e.g., processing, storage, networking resources, etc.). costs, time, and/or the like. It may also improve efficiency of utilization of cloud resources across multiple cloud services since the usage (utilization) of resources may be analyzed per cloud service across a plurality of cloud services to identify overutilization and/or underutilization in general and per cloud service.

Moreover, while the virtual tag engine may be agnostic to the underlying cloud services and communication between the virtual tag engine and the plurality of cloud services may be transparent to the users, the virtual tag engine may expose all functionality, settings, controls, and/or options specific to each of the cloud services. As such, the virtual tags created based on tag rules taking advantage of all the functionality, flexibility, and/or operability supported by each of the cloud services may be highly advanced, complex, and/or flexible to accurately address any tagging scheme which may be supported by each of the individual cloud services.

Furthermore, the virtual tags allow for defining complex tagging rules which may be applied to both real-time cloud resources usage monitoring as well as past (historic) usage thus significant increasing performance, for example, precision and accuracy of usage monitoring, cost tracking, resource allocation, and other cloud management tasks of cloud resources across multiple independent cloud services.

Also, exporting the usage data, optionally coupled with virtual tags to the user's own storage elements, for example, containers, buckets, and the like may significantly increase flexibility and/or control to the user in terms of data accessibility and/or analysis, and may simplify compliance with various data governance regulations.

In addition, enabling recursive virtual tags and recursive tagging rules, for real-time and/or historic usage data may enable creation of increased complexity virtual tags which may be applied to monitor and track usage of cloud resources across multiple cloud services with increased customization, accuracy, consistency, and/or granularity which may allow for increased utilization, reduced cost, and/or the like of cloud resources across multiple cloud services. Moreover, this recursive feature may enhance the dynamic, adaptable nature of the system, thus allowing for ongoing refinement and improvement of resource tagging strategies. Furthermore, the ability to define virtual tags recursively and interpret such definitions in real-time across multiple different cloud services may extend the system's use case potential and increases its value to users, as it offers an unprecedented level of control, precision, and/or scalability in cloud resource management.

The recursive tagging may further allow creating hierarchical tags having multiple levels which may be dynamically adjusted in real-time. In particular, only one of the hierarchy levels of a virtual tag may be dynamic while the rest of the levels may be static in nature. This hierarchical structuring of virtual tags may allow ongoing users of the system to update only one of the hierarchical levels which will project on all its higher level depending virtual tags to automatically update accordingly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary processes of monitoring usage of cloud resources across multiple cloud services, according to some embodiments of the present invention.

An exemplary processes 100 may be executed, for example, by a unified data engine 220 to collect usage data from a plurality of cloud services. The usage data may relate to usage of a plurality cloud resources by a plurality of clients. Based on the collected usage data, the unified data engine 220 may create, maintain, and/or update a unified data structure mapping the use of the cloud resources of multiple cloud services by the clients.

An exemplary processes 110 may be executed, for example, by a virtual tag engine 222 to apply one or more virtual tags on the unified data structure to monitor the usage (utilization) of the cloud resources by the clients. The virtual tag engine 222 may further execute one or more multi-cloud operations over the cloud services according to one or more of the virtual tags, for example, detect anomalous usage, scale cloud resources according to current usage and/or usage patterns, generate unified usage reports, and/or the like.

Figure 2A:
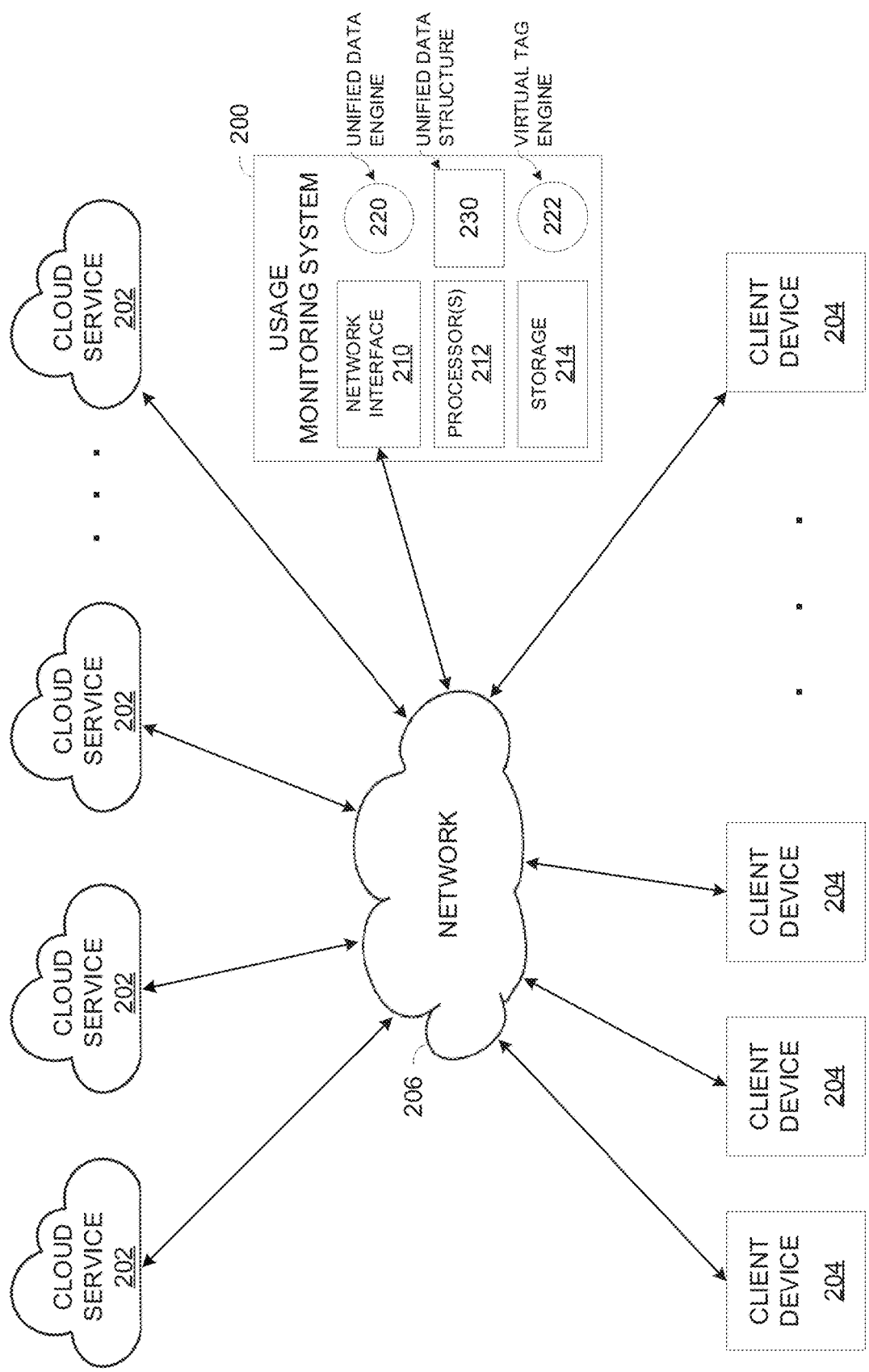
FIG. 2A and FIG. 2B are schematic illustrations of an exemplary system for monitoring usage of cloud resources across multiple cloud services, according to some embodiments of the present invention.
Figure 2B:
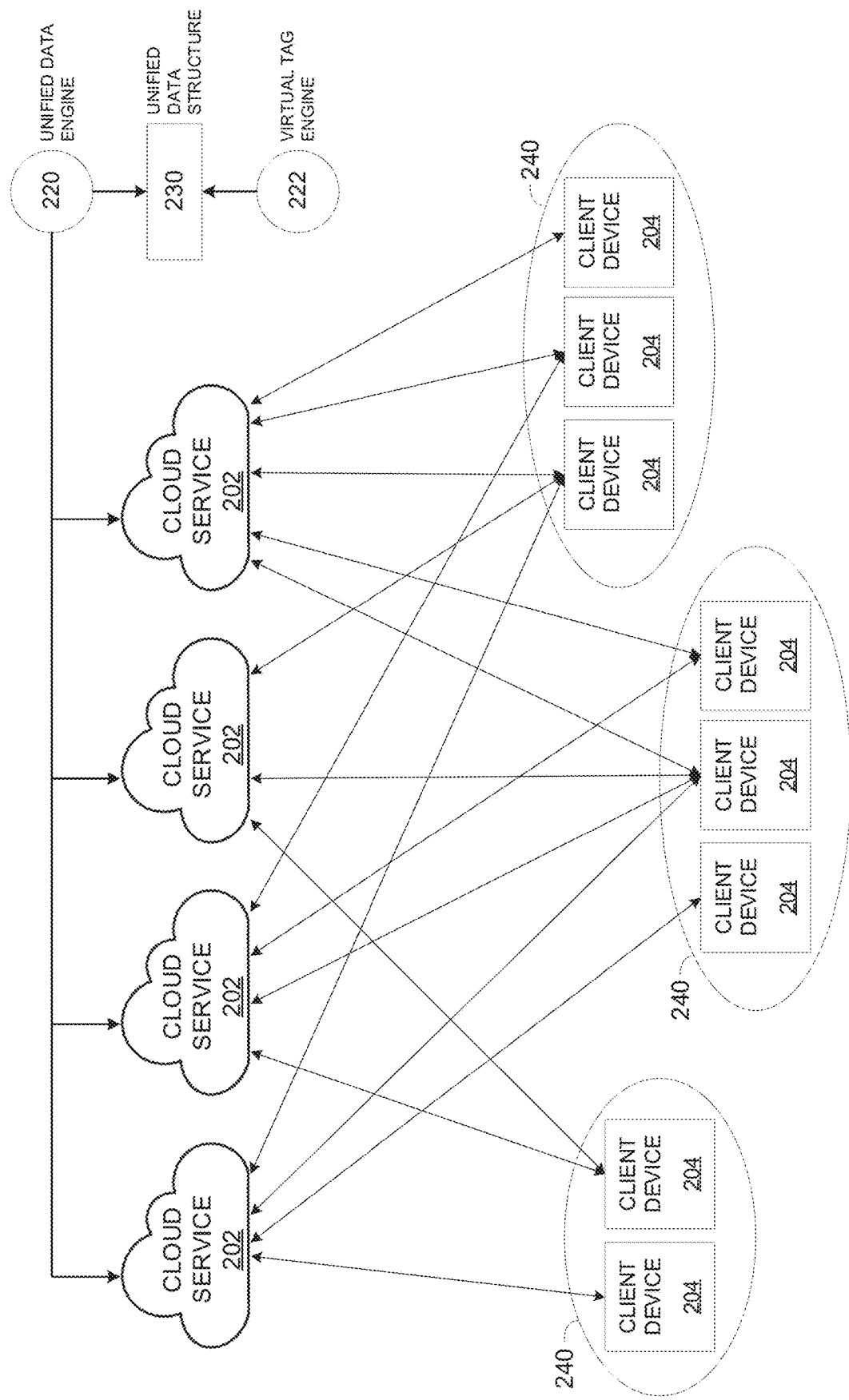

Reference is also made to FIG. 2A and FIG. 2B, which are schematic illustrations of an exemplary system for monitoring usage of cloud resources across multiple cloud services, according to some embodiments of the present invention.

As seen in FIG. 2A, an usage monitoring system 200 may be adapted to monitor usage of cloud resources, for example, computing resources, storage resources, networking resources, and/or the like of a plurality of cloud services 202, for example, AWS, EC2, GCP, Azure, Oracle, Alibaba, DataDog, Kubernetes, Prometheus, Logz.io, CronJob, and/or the like by a plurality of client devices 204.

The usage monitoring system 200 may be further adapted to execute one or more operations, for example, multi-cloud operations based on one or more virtual tags applied unified usage data unifying information relating to usage of cloud resources across at least some of the plurality of cloud services 202.

The client devices 204 may include one or more client devices associated, and/or used by users, for example, a desktop, a laptop, a Smartphone, a tablet, and/or the like. However, the client devices 204 may include one or more client devices 204, for example, a server, a computing unit, a communication and/or network equipment, a database, and/or the like which are not necessarily associated with specific users but may be rather adapted and/or deployed to execute global tasks, provide services, and/or the like.

The client devices 204 may communicate and connect to the cloud services 202 via one or more networks, designated network 206, comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

As seen in FIG. 2B, the plurality of client devices 204 may be typically associated with one or more entities 240. The entities 240 may include, for example, a company, an organization, an institution, a firm, an agency, and/or the like which may be distinct, and separate from each other. In another example, the entities 240 may include one or more groups, divisions, projects, tasks and/or the like within the same company, organization, institution, and/or the like, for example, an R&D group, a DevOps team, a finance staff, a marketing unit, a project team, a task force, and/or the like. Obviously the entities 240 may also include a plurality of groups, divisions, projects, tasks and/or the like within a plurality of different companies, organizations, institutions, firms, agencies, and/or the like.

As also illustrated in FIG. 2B, each of the client devices 204 may connect to one or more of cloud services 202 and use (utilize) cloud resources provided by these cloud services 202. As such, client devices 204 associated with a single entity 240 may use cloud resources provided by multiple cloud services 202.

The usage monitoring system 200 may also communicate with the cloud services 202 via the network 206 to collect usage data relating to use of cloud resources of the cloud services 202 by the client devices 204. Moreover, via the network 206, the usage monitoring system 200 may also communicate with one or more automated systems, manually operated device, and/or a combination thereof of one or more of the entities 240, for example, a cloud resources utilization monitoring system, a cost monitoring system, an IT person, a cloud resources coordinator and/or supervisor, and/or the like for one or more actions, operations, and/or the like executed based on the collected usage data. Specifically, the usage monitoring system 200 may use one or more virtual tags applied to the collected usage data for executing actions, and/or operations, specifically multi-cloud operations.

The usage monitoring system 200, for example, a server, a processing node, a cluster of processing nodes, and/or the like may comprise a network interface 210 for connecting to the network 206, a processor(s) 212 for executing the processes 100 and 110, and a storage 214 for storing data and/or code (program store).

The network interface 210 may include one or more wired and/or wireless network interfaces, ports, and/or links, implemented by hardware, software, firmware, and/or a combination thereof for connecting to the network 206.

The processor(s) 212, homogenous or heterogeneous, may include one or more processing nodes and/or cores optionally arranged for parallel processing, as clusters and/or as one or more multi core processor(s).

The storage 214 may include one or more non-transitory persistent storage devices, for example, a ROM, a Flash array, a Solid State Drive (SSD), a hard drive (HDD), and/or the like. The storage 214 may also include one or more volatile devices, for example, a RAM component, a cache, and/or the like. Optionally, the storage 214 may further comprise one or more network storage devices, for example, a storage server, a Network Accessible Storage (NAS), a network drive, a database server and/or the like accessible through the network interface 210.

The processor(s) 212 may execute one or more software modules such as, for example, a process, a script, an application, a (device) driver, an agent, a utility, a tool, an Operating System (OS), a plug-in, an add-on, and/or the like each comprising a plurality of program instructions stored in a non-transitory medium (program store) such as the storage 214 and executed by one or more processors such as the processor(s) 212.

The processor(s) 212 may optionally integrate, utilize and/or facilitate one or more hardware elements (modules) integrated and/or utilized in the usage monitoring system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 212 may therefore execute one or more functional modules implemented using one or more software modules, one or more of the hardware modules and/or combination thereof.

For example, the processor(s) 212 may execute the unified usage data engine 220 for executing the process 100. As seen in FIG. 2B, the unified usage data engine 220 executing the process 100 may communicate with the plurality of cloud services 202 to collect usage data relating to use of cloud resources of the cloud services 202 by the plurality of client devices 204.

The unified usage data engine 220 may further create and/or update a unified data structure 230 storing combined and unified (cumulative) usage data collected and/or aggregated from all cloud services 202 in a single structure, for example, a file, a record, a database, a table, a list and/or the like. For brevity, the unified data structure 230 is described in singular form. However, as may become appreciated by a person skilled in the art, the unified data structure 230 may comprise and/or be construct of a plurality of structures which collectively form the unified data structure 230.

In another example, the processor(s) 212 may execute the virtual tag engine 222 for executing the process 110. As seen in FIG. 2B, the virtual tag engine 222 executing the process 110 may apply one or more virtual tags to the unified data structure 230 and using the virtual tag(s) for executing one or more operations, for example, multi-cloud operations across at least some of the cloud services 202.

Optionally, the usage monitoring system 200, specifically the unified usage data engine 220 and the virtual tag engine 222 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, AWS, EC2, IBM Cloud, and/or the like which may communicate with the cloud services 202 via the network 206 and/or internal networking and/or communication protocols to collect the usage data relating to usage of cloud resources of the cloud services 202 by the client devices 204.

Moreover, the usage monitoring system 200 may be deployed using volatile compute hardware architecture, as known in the art, which supports running on volatile compute hardware such as, for example, spot instances. This deployment may be facilitated by separation of the compute layer from the storage layer. The compute layer may comprise the virtual tag engine 222 adapted to create and process virtual tags and tagging rules while the storage layer may hold the actual virtual resources and their associated metadata, including the virtual tags. This separation may ensure that even if the compute hardware is volatile and gets interrupted, corrupted, and/or replaced, the storage remains intact and not impacted.

This decoupled deployment may be highly scalable as it may leverages the concept of decoupled scalable storage and compute in which the scalable storage layer may expand or contract based on the amount of cloud resources usage data and virtual tags stored, while the compute layer may adjust according to the complexity and volume of the tagging rules. This separation may allow easy migration of workloads to more compute power when needed thus ensuring optimal performance and resource usage.

As shown at 102, the process 100 executed, for example, by the unified data engine 220 starts with the unified data engine 220 collecting cloud resources usage data relating to use (utilization) of a plurality of cloud resources of a plurality of cloud services 202 by a plurality of client devices (clients) 204.

The cloud resources may include, for example, computing resources such as, for example, Virtual Machines (VM), and/or the like, storage resources (storage objects), networking resources (network components), databases, and more.

Since they are independent and separate from each and typically provided by different vendors, the plurality of cloud services 202 may each utilize, employ and/or expose a respective API, access protocol, communication interface and/or the like for communicating and exchanging data with the with the respective cloud service 202. For example, a first cloud service 202, for example, DataDog may utilize a first API which is different from a second API used by a second cloud service 202, for example, AWS.

The unified data engine 220 may therefore communicate with each of the plurality of cloud services 202, via the network 206, using the respective API, access protocol, communication interface and/or the like of the respective cloud service 202.

As shown at 104, based on the cloud resources usage data, the unified data engine 220 may update a unified data structure 230 which maps usage of the plurality of cloud resources by the plurality of client devices 204. As such, the unified data structure 230 may map cumulative, collective, and/or overall usage data relating to usage of the cloud resources across the plurality of cloud services 202.

Optionally, during an initial operation, and/or initialization sequence of the unified data engine 220, the unified data engine 220 may create the unified data structure 230 is it does not already exist, for example, a file, a record, a database, a table, a list and/or the like for storing the usage of the cloud resources by the client devices 204.

The unified data engine 220 may aggregate the cloud resource data collected from the plurality of cloud services 202 and may arrange and update the cloud resources usage data in the unified data structure 230 according to one or more criteria, conditions, distributions, cross-sections, and/or the like. For example, the unified data engine 220 may arrange cloud resources usage data according to the client devices 204 such that each client device 204 may be associated with usage data relating to any cloud resource of any cloud service 202 used by the respective client device 204. In another example, the unified data engine 220 may arrange cloud resources usage data according to the entities 240 such that each entity 240, for example, an R&D group, a DevOps team, and/or the like may be associated with usage data relating to any cloud resource of any cloud service 202 used by the client devices 204 of the respective entity 240. In another example, the unified data engine 220 may arrange cloud resources usage data according to each of one or more cloud resources, for example, VMs used by the client devices 204 across multiple cloud services 202.

The unified data engine 220 may construct, i.e., create and/or update the unified data structure 230 to expose most and optionally all features of each of the plurality of cloud services 202 to enable defining tag rules with respect to cloud resource of each cloud service 202 using one or more of the features of the respective cloud service 202.

The features of each cloud service 202, which may relate to cloud resources provided by the respective cloud services 202, may include, for example, settings, capabilities, availability, and/or the like of its cloud resources. For example, features of a certain cloud service 202 may include settings such as for example, keys, values, and/or the like relating to the cloud resources provided by the certain cloud service 202.

As shown at 106, the unified data engine 220 may continuously, constantly, and/or periodically (e.g., every second, every 15 seconds, every minute, once an hour, etc.) collect updated cloud resources usage data in real-time and update accordingly the unified data structure 230.

The unified data structure 230, which may be continuously, constantly, and/or periodically updated, may therefore reflect real-time and current cloud resource usage of the cloud resources by the client devices 204 as well as past (historical) cloud resource usage of the cloud resources by the client devices 204 over a predefined past time period, for example, a week, a month, six months, a year, three years, and/or the like.

As shown at 112, the process 110 executed, for example, by the virtual tag engine 222 starts with the virtual tag engine 222 generating one or more virtual tags for monitoring the usage of one or more cloud resources of multiple cloud services 202 by one or more of the client devices 204.

Tags, as known in the art, add contextual information to cloud resources within a cloud environment such as the cloud services 202, for example, computing resources such as, for example, VMs, storage resources (storage objects), networking resources (network components), databases, and more. The tags may comprise metadata, labels, identifiers, and/or the like, collectively designated metadata, attached and/or associated with cloud resources of cloud services such as the cloud services 202. A tag may typically consists of a key-value pair, where the "key" is a label or category and the "value" provides specific information about the cloud resource related to that label.

For example, assuming a certain cloud resource of a certain cloud service 202 comprises a VM. In such case, one or more tags may be associated with the VM to provide information relating to usage of the VM by one or more of the client devices 204. Exemplary tags defined for the VM may include, for example:

Key: Purpose|Value: Web Server
Key: Owner|Value: IT Department
Key: Environment|Value: Production
Key: Cost Center|Value: CC12345

These tags may enable efficient identification of the purpose of the VM (web server), its owner (IT Department), the environment it's in (Production), and the associated cost center (CC12345). This information is valuable for cost allocation, resource management, troubleshooting, and other operational tasks.

However, such tags known in the art may be limited to a single cloud service 202 since the cloud services 202 may be independent of each other and typically provided, and/or operated by different vendors thus preventing cross cloud tagging. Moreover, each of the cloud services 202 may utilize its own tagging mechanism, functionality, features, interface, and/or the like which may further prevent multi-cloud tagging.

The virtual tags created and/or defined by the virtual tag engine 222, on the other hand, may be applied to multiple different cloud services 202 which may be independent of each other and may utilize different tagging mechanism. This means that each virtual tag may be created and defined to reflect aggregated and/or cumulative usage of one or more cloud resources by one or more client devices 204 (clients) across a plurality of cloud services 202 rather than resources of a single cloud resource 202 as done by legacy tags.

In particular, the virtual tag engine 222 may generate each virtual tag based on one or more tag rules. The tag rules may be defined, as known in the art, using one or more of the features exposed for each of one or more of the cloud services 202, for example, tag keys and values, tagging policies, tag propagation, permission, access control, tagging reports, tagging analytics, tag governance, tag automation, and/or the like.

For example, assuming a certain tag rule defines monitoring cloud computing resources, e.g., VMs of any cloud service 202 used by client devices 204 of a certain entity 240, for example, a DevOps team. In such case, the virtual tag engine 222 may create a virtual tag which monitors such usage of VMs across all cloud services 202 by the client devices 204 of the DevOps team and may update the virtual tag based on analysis of the cloud usage data collected, aggregated and mapped in the unified data structure 230.

The tag rules, based on which the virtual tag engine 222 creates the virtual tag(s), may be created and/or defined using one or more methods, and/or techniques. For example, one or more tag rules may be manually defined by one or more users, for example, an IT person, and/or the like.

The virtual tag engine 222 may provide one or more interfaces for interacting with users, for example, to enable the user(s) to generate tag rules. For example, the virtual tag engine 222 may be adapted to expose one or more user interfaces, for example, a Graphical User Interfaces (GUI), a Command Line Interface (CLI), and/or the like executed by one or more client devices such as the client device 204 used by the use(s). In another example, the virtual tag engine 222 may be adapted to adjust one or more web based Graphical User Interfaces (GUI) for interacting with the user(s) and provide them with GUI means, for example, controls to generate tag rules.

The virtual tag engine 222 may be adapted to expose an API for interacting and/or communicating with one or more applications, and/or systems used to create one or more tag rules, either manually and/o automatically. As such, one or more applications, tools, agents, and/or systems may be adapted to use the API of the virtual tag engine 222 to define and/or provide tag rules, according to which the virtual tag engine 222 may create one or more virtual tags.

Optionally, the virtual tag engine 222 may apply one or more virtual tags to also reflect historic cloud resources usage data recorded in the unified data structure prior to creation and application of the respective virtual tag such that the respective virtual tags may be applied retroactively and/or backward to reflect past usage of the cloud resources of the cloud services 202 by the client devices 204.

This means that in addition to updating the virtual tag (metadata) according to newly updated cloud resources usage data collected from the cloud services, one or more virtual tags may be adapted to also reflect also cloud resources usage data collected in the past before the respective virtual tag was applied and stored in the unified data structure 230.

Optionally, the virtual tag engine 222 may generate one or more recursive virtual tags based on one or more other virtual tags created based on one or more other tag rules. In particular, one or more recursive virtual tags may be created due to interdependencies between tag rules. A recursive virtual tag may therefore refer to a virtual tag whose value may depend upon the application of one or more other tagging rules. Employing recursive virtual tag generation may facilitate hierarchical virtual tags having one or more levels which may be dynamically adjusted in real-time according to new and/or adjusted tag rules.

In order to identify such intendancies and create recursive virtual tags accordingly to reflect the interdependency(s), the virtual tag engine 222 may analyze the tag rules received for defining virtual tags. For example, assuming a virtual tag that tags a certain cloud resource as "Project X" if (1) it is used by one or more client devices 204 associated with a "Marketing" department entity 240 and (2) is created by "User A". In such case, a recursive virtual tag may be created to tag this certain cloud resource as "High Priority" if the certain cloud resource has the "Project X" virtual tag and has been running for over a certain time period, e.g., a certain number of hours.

The virtual tag engine 222 may automatically detect dependency between a plurality of interdepending tag rules using one or more analysis methods, techniques, and/or algorithms. For example, the virtual tag engine 222 may use Natural Language Processing (NLP) to analyze one or more tag rules and extract tagging logic defined by the respective tag rules. In another example, the virtual tag engine 222 may analyze one or more tag rules according to a rule based model to determine the tagging logic defined by the respective tag rules. In another example, the virtual tag engine 222 may use one or more trained ML models applied to one or more tag rules to estimate, predict, and/or otherwise determine the tagging logic defined by the respective tag rules.

The virtual tag engine 222 may create recursive virtual tags which may be applied onward to cloud resources usage data captured in real-time, i.e., from the time the virtual tag is applied and onward, and/or backward to cloud resources usage data collected in the past before the respective virtual tag was applied.

As shown at 114, the virtual tag engine 222 may apply the virtual tag(s) to the unified data structure 230 which maps usage of the cloud resources of the plurality of cloud services 202 whose cloud resources are used by the client devices 204. This means that rather than applying standard individual tags to each of the different cloud services 202, the virtual tag engine 222 may apply the virtual tag(s) on the usage data mapped by unified data structure 230 which maps usage of the cloud resources across multiple cloud services 202 such that each virtual tag may apply simultaneously to a plurality of cloud services 202.

Moreover, since the virtual tags are applied on the unified data structure 230, the virtual tags may be agnostic to the cloud services 202 whose cloud resources are used by the client devices 204.

The virtual tag engine 222 may update each virtual tag (metadata) based on analysis of the cloud usage data updated in the unified data structure 230 which, as described herein before, is aggregated for the plurality of cloud services 202.

Since, the cloud resource data may be continuously and/or periodically updated in the unified data structure 230 in real-time, based on analysis of the updated cloud resource usage data, the virtual tag engine 222 may update the virtual tags in real-time to accurately reflect usage of cloud resources across multiple cloud services 202.

As shown at 116, the virtual tag engine 222 may execute one or more operations, specifically multi-cloud operations over the multiple cloud services using one or more of the virtual tag(s) applied to monitor usage of the cloud resources of the cloud services 202 by the client devices 204.

For example, an exemplary multi-cloud operation executed by the virtual tag engine 222 may comprise detecting one or more anomalous usage of one or more cloud resources of multiple cloud services 202 by one or more of the client devices (clients). In particular, the virtual tag engine 222 may detect anomalous usage of the cloud according to one or more anomaly rules applied to one or more of the virtual tag(s).

For example, a certain anomaly rule may define that a group of client devices 204 of a certain entity 240, for example, a customer service team, may use up to a certain maximum capacity of storage resources across multiple cloud services 202, for example, AWS, GCP, and Kubernetes. Assuming a corresponding virtual tag is created, i.e., a virtual tag to monitor usage of cloud storage resources used by the customer service team across the three cloud services 202, the virtual tag engine 222 may analyze the virtual tag to detect whether the capacity of cloud storage resources used by client devices associated with the customer service team exceeds the certain maximum capacity. In case the used cloud storage resources does exceed the certain maximum capacity, the virtual tag engine 222 may determine that the usage may be an anomaly.

Optionally, the virtual tag engine 222 may generate one or more notifications, alerts, messages, and/or the like to inform one or more people and/or automated cloud monitoring/control systems about the detected anomaly. For example, the virtual tag engine 222 may operate and/or adjust a web based GUI executed by one or more client devices of one or more users, for example, an IT person, a supervisor, and/or the like to inform the user(s) of the detected anomaly. In another example, the virtual tag engine 222 may transmit, via the network 206, one or more notification messages informing of the detected anomaly, for example, a text message, an email message, a network packet, and/or the like to one or more users and/or one or more automated cloud monitoring/control systems.

Optionally, the anomaly rule may be generated automatically, for example, by the virtual tag engine 222 according to typical cloud resources usage patterns identified over time. For example, assuming that over a certain time period, for example, a week, a month, and/or the like, the virtual tag engine 222 identifies the group of client devices 204 associated with the customer service team uses a certain daily storage capacity of storage resources at the three cloud services 202. Further assuming, that the virtual tag engine 222 identifies a daily usage of cloud storage resources by this group of client devices 204 which significantly exceeds the typical daily use, the virtual tag engine 222 may determine this is an anomalous usage and may optionally generate one or more notifications, alerts, messages, and/or the like to inform about the anomaly.

Another exemplary multi-cloud operation executed by the virtual tag engine 222 may comprise communicating automatically with one or more of the cloud services 202 to request adjustment of allocation of one or more of its cloud resources according to one or more of the virtual tag(s).

For example, assuming that, based on one or more virtual tags, the virtual tag engine 222 identifies that client devices 204 associated with a certain entity 240, for example, R&D group utilize almost all (e.g., 90%) computing resources allocated to it across multiple cloud services 202, for example, four different cloud services. In such case the virtual tag engine 222 may automatically communicate with one or more of the cloud services 202 to scale up, i.e., increase the amount of computing resources allocated for the R&D group. In another example, assuming that, based on one or more virtual tags, the virtual tag engine 222 identifies that client devices 204 associated with the R&D group utilizes significantly little of their allocated computing resources, for example, 50%, the virtual tag engine 222 may automatically communicate with one or more of the cloud services 202 to scale down, i.e., reduce the amount of computing resources allocated for the R&D group.

Another exemplary multi-cloud operation executed by the virtual tag engine 222 may comprise generating one or more unified usage reports according to one or more of the virtual tag(s), for example, a utilization report, a cost report, a usage distribution report (across multiple cloud services 202), and/or the like. The virtual tag engine 222 may analyze the virtual tag(s) which aggregate usage of one or more cloud resources by one or more client devices 204 across a plurality of cloud services 202 and may generate accordingly one or more unified usage reports reflecting usage of the respective cloud resource(s) of the multiple cloud services 202 which were used by the respective client devices 204 (clients).

For example, assuming a certain group of client devices 204 of a certain entity 240, for example, a research team uses cloud computing and storage resources at a plurality of cloud services 202, for example, DataDog, and GCP. Further assuming that one or more corresponding virtual tags are created to monitor usage of cloud computing and storage resources by the group of client devices 204 associated with the research team. In such case, based on analysis the virtual tag engine 222 may analyze the corresponding virtual tag(s) to determine overall (aggregated) usage of the cloud computing and storage resources by the client devices 204 across both the DataDog, and GCP cloud services 202 and may generate one or more unified usage reports accordingly. Such reports may include, for example, a first unified usage report reflecting usage of cloud computing and storage resources across the DataDog, and GCP cloud services 202, a second unified usage report reflecting usage of only cloud computing resources across the DataDog, and GCP cloud services 202, a third unified usage report reflecting usage of only cloud storage resources across the DataDog, and GCP cloud services 202, and/or the like.

Another exemplary multi-cloud operation executed by the virtual tag engine 222 may comprise exporting the cloud resources usage data and/or part thereof which relates to one or more client devices 204 (clients) associated with one or more entities 240, and/or users to one or more storage resources of the respective entity(s) and/or user(s), for example, a storage container, a bucket, and/or the like.

For example, the virtual tag engine 222 may be adapted to analyze one or more virtual tags created for monitoring usage of cloud resources of multiple cloud services 202 by one or more client devices 204 associated with a certain entity 240, for example, a DevOps group of a cyber-security company. Based on the virtual tag(s), the virtual tag engine 222 may extract resources usage data relating to usage of cloud resources of the multiple cloud services 202 by the DevOps group and may export at least some of this usage data to one or more storage buckets associated with the cyber-security company to enable review, analysis, auditing, and/or the like of the usage of cloud resources by DevOps group.

Figure 3:
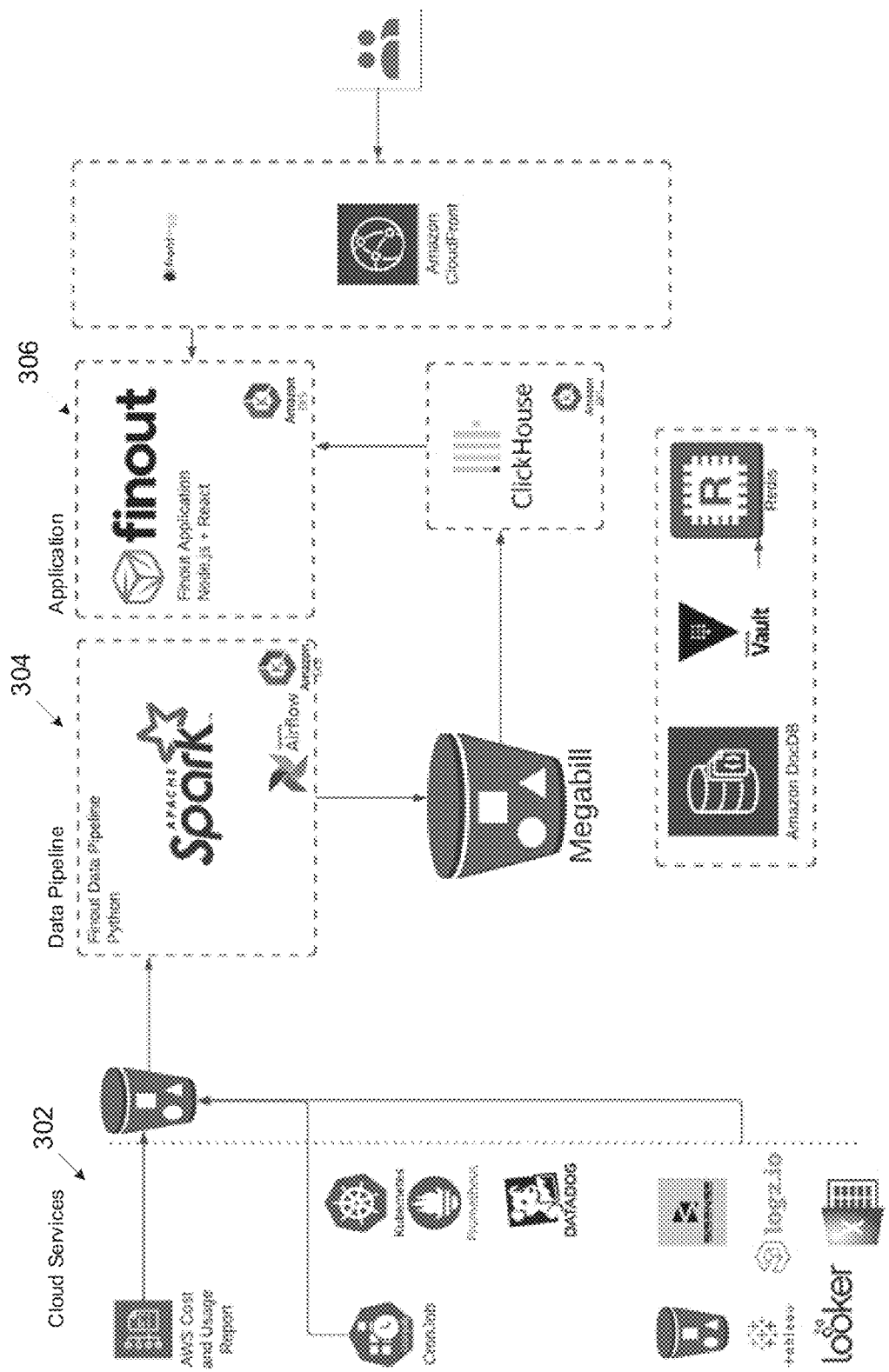
FIG. 3 is a schematic illustration of exemplary building blocks of a system for monitoring usage of cloud resources across multiple cloud services, according to some embodiments of the present invention.

Reference is now made to FIG. 3, which is a schematic illustration of exemplary building blocks of a system for monitoring usage of cloud resources across multiple cloud services, according to some embodiments of the present invention.

An exemplary data pipeline 304 adapted to facilitate access for an application 306 to a plurality of cloud services 302 such as the clouds services 202. The application 306 may be adapted to apply virtual tags to monitor cloud resource usage across multiple cloud services 302 and execute and/or support accordingly a plurality of multi-cloud operations, services, and/or applications.

In particular, the applications 306 may comprise a unified usage data engine such as the unified data engine 220 adapted to communicate with the plurality of cloud services 302 to collect cloud resources usage data relating to usage of cloud resources of the plurality of cloud services 302 and update accordingly a unified data structure such as the unified data structure 230 to reflect cumulative and/or aggregated cloud resources usage across the plurality of cloud services 302.

The applications 306 may also include and/or integrate a virtual tag engine such as the virtual tag engine 222 adapted to create, apply and/or activate one or more virtual tags over the unified data structure 230 to monitor usage of cloud resources across the plurality of cloud services 302, and execute one or more operations, specifically multi-cloud operations according to the virtual tag(s). For example, the virtual tag engine 222 may generate a unified cost report, designated Magabill in FIG. 3.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client devices, and cloud resources are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for monitoring usage of cloud resources across multiple cloud services, comprising:
   a unified data engine adapted to:
      collect cloud resources usage data relating to a plurality of cloud resources of multiple types of resources, of a plurality of different cloud services used by a plurality of clients,
      update, based on the cloud resources usage data, a unified data structure mapping usage of the plurality of cloud resources by the plurality of clients, wherein said unified data structure is a centralized data structure which is at least one of: adapted, structured, arranged, and updated, to reflect for each of said multiple cloud services, a respective specific set of features of the respective cloud service associated with a respective at least one cloud resource by adapting a dedicated structure of each of at least one virtual tag in accordance with a corresponding cloud service associated with a corresponding cloud resource, and
      aggregate usage information of the at least one cloud resource derived from each of said respective specific set of features of respective cloud services operated by the plurality of clients; and
   a virtual tag engine adapted to:
      generate the at least one virtual tag based on at least one tag rule and the aggregated usage information, for monitoring usage of at least one cloud resource of multiple cloud services by at least one of the plurality of clients,
      apply the at least one virtual tag to the unified data structure, and
      execute at least one multi-cloud operation over the multiple cloud services using the at least one virtual tag.

2. The system of claim 1, wherein the at least one multi-cloud operation comprises detecting at least one anomalous usage of the at least one cloud resource of the multiple cloud services by the at least one client according to at least one anomaly rule applied to the at least one virtual tag.

3. The system of claim 1, wherein the at least one multi-cloud operation comprises communicating automatically with at least one of the cloud services to request adjustment of allocation of at least one of its cloud resources according to the at least one virtual tag.

4. The system of claim 1, wherein the at least one multi-cloud operation comprises generating at least one unified usage report according to the at least one virtual tag, the at least one unified usage report reflects usage of the at least one cloud resource of the multiple cloud services by the at least one client.

5. The system of claim 1, wherein the at least one multi-cloud operation comprises exporting at least part of the cloud resources usage data relating to at least one client associated with at least one user to at least one storage resource of the at least one user.

6. The system of claim 1, wherein the unified data structure is continuously updated based on updated cloud resources usage data collected in real-time.

7. The system of claim 1, wherein the unified data engine constructs the unified data structure to expose all features of each of the plurality of cloud services to enable defining the at least one tag rule with respect to each of at least one of a plurality of features of each of at least one of the plurality of cloud services.

8. The system of claim 1, wherein the unified data engine collects the usage data relating to the plurality of cloud services by communicating with each of the plurality of cloud services using its respective application programming interface (API).

9. The system of claim 1, further comprising applying the at least one virtual tag to reflect historic cloud resources usage data recorded in the unified data structure prior to the applying of the at least one virtual tag.

10. The system of claim 1, further comprising generating at least one recursive virtual tag based on at least one another virtual tag.

11. The system of claim 1, further comprising generating the at least one virtual tag based on a plurality of interdepending tag rules having dependency relation with each other.

12. The system of claim 11, further comprising automatically detecting the dependency between the plurality of interdepending tag rules.

13. The system of claim 1, wherein the at least one tag rule is user defined.

14. The system of claim 1, wherein the virtual tag engine is further adapted to adjust at least one web based graphical user interface (GUI) for interacting with at least one user to support the at least one user in conducting at least of: generating tag rules, and accessing report data generated by the virtual tag engine.

15. The system of claim 1, wherein the virtual tag engine is further adapted to expose an application programming interface for interacting with at least one application to enable the at least one application to conduct at least of generate tag rules, and access report data generated by the virtual tag engine.

16. The system of claim 1, wherein each of the at least one virtual tag of a cloud resource consists of a key-value pair, where the key of the key-value pair defines a category and the value of the key-value pair provides specific information related to a respective cloud resource related to said category.

17. The system of claim 1, wherein each of said specific set of features of the respective cloud service comprises at least one of: settings of a cloud resource of said respective cloud service, capabilities of said cloud resource of said respective cloud service, availability of said cloud resource of said respective cloud service, controls of said cloud resource of said respective cloud service and operation options of said cloud resource of said respective cloud service.

18. A method of monitoring usage of cloud resources across multiple cloud services, comprising:
  using a unified data engine for:
    collecting cloud resources usage data relating to a plurality of cloud resources of multiple types of resources of a plurality of different cloud services used by a plurality of clients,
    updating, based on the cloud resources usage data, a unified data structure mapping usage of the plurality of cloud resources by the plurality of clients, wherein said unified data structure is a centralized data structure which is at least one of: adapted, structured, arranged, and updated, to reflect for each of said multiple cloud services, a respective specific set of features of the respective cloud service associated with a respective at least one cloud resource by adapting a dedicated structure of each of at least one virtual tag in accordance with a corresponding cloud service associated with a corresponding cloud resource, and
    aggregating usage information of the at least one cloud resource derived from each of said respective specific set of features of respective cloud services operated by the plurality of clients; and
  using a virtual tag engine for:
    generating the at least one virtual tag based on at least one tag rule and the aggregated usage information, for monitoring usage of at least one cloud resource of multiple cloud services by at least one of the plurality of clients,
    applying the at least one virtual tag to the unified data structure, and
    executing at least one multi-cloud operation over the multiple cloud services using the at least one virtual tag.

19. A computer program product of monitoring usage of cloud resources across multiple cloud services, comprising a non-transitory medium storing thereon computer program instructions which, when executed by at least one hardware processor, cause the at least one hardware processor to:
  execute a unified data engine for:
    collecting cloud resources usage data relating to a plurality of cloud resources of multiple types of resources, of a plurality of different cloud services used by a plurality of clients,
    updating, based on the cloud resources usage data, a unified data structure mapping usage of the plurality of cloud resources by the plurality of clients, wherein said unified data structure is a centralized data structure which is at least one of: adapted, structured, arranged, and updated, to reflect for each of said multiple cloud services, a respective specific set of features of the respective cloud service associated with a respective at least one cloud resource by adapting a dedicated structure of each of at least one virtual tag in accordance with a corresponding cloud service associated with a corresponding cloud resource, and
    aggregating usage information of the at least one cloud resource derived from each of said respective specific set of features of respective cloud services operated by the plurality of clients; and
  execute a virtual tag engine for:
    generating the at least one virtual tag based on at least one tag rule and the aggregated usage information, for monitoring usage of at least one cloud resource of multiple cloud services by at least one of the plurality of clients,
    applying the at least one virtual tag to the unified data structure, and
    executing at least one multi-cloud operation over the multiple cloud services using the at least one virtual tag.

* * * * *

UNITED STATES PATENT AND TRADEMARK OFFICE
CERTIFICATE OF CORRECTION

| | | |
|---|---|---|
| PATENT NO. | : 12,147,322 B1 | Page 1 of 1 |
| APPLICATION NO. | : 18/513712 | |
| DATED | : November 19, 2024 | |
| INVENTOR(S) | : Zohar Yizhar Gilboa et al. | |

It is certified that error appears in the above-identified patent and that said Letters Patent is hereby corrected as shown below:

On the Title Page

Item (54) and in the Specification, Column 1, Line 1, Change "DYNAMIC MULTI CLOUD CONTROL" to --VIRTUAL TAGS AND DATA STRUCTURE FOR MONITORING CLOUD RESOURCES--

Signed and Sealed this
Fifteenth Day of July, 2025

Coke Morgan Stewart
*Acting Director of the United States Patent and Trademark Office*